US005958557A

United States Patent [19]

Naor

[11] Patent Number: 5,958,557

[45] Date of Patent: Sep. 28, 1999

[54] RADOME PANEL

[76] Inventor: Menachem Naor, 27 Einstein St., Haifa 34604, Israel

[21] Appl. No.: 08/986,796

[22] Filed: Dec. 8, 1997

[51] Int. Cl.[6] ................................ B32B 1/00; H01Q 1/42

[52] U.S. Cl. .............................. 428/174; 428/33; 428/57; 428/61; 428/172; 428/213; 250/515.1; 250/517.1; 331/67; 343/872; 343/909; 264/241

[58] Field of Search .................................... 428/192, 172, 428/33, 53, 59, 60, 61, 174, 57, 213; 250/515.1, 517.1; 331/67, 87; 343/872, 909; 264/241, 248, 249, 257, 285, 112

[56] References Cited

U.S. PATENT DOCUMENTS

| | | | |
|---|---|---|---|
| 3,773,603 | 11/1973 | Schulander | 428/59 |
| 4,180,605 | 12/1979 | Gilbert | 428/76 |
| 4,287,245 | 9/1981 | Kikuchi | 428/60 |
| 5,294,273 | 3/1994 | Tripp | 428/60 |
| 5,323,170 | 6/1994 | Lang | 348/872 |
| 5,344,685 | 9/1994 | Cassell | 428/66 |
| 5,357,726 | 10/1994 | Effenberger et al. | 52/309.7 |

*Primary Examiner*—Donald Loney
*Attorney, Agent, or Firm*—Browdy and Neimark

[57] ABSTRACT

A contoured panel section for a radome for use with a center frequency corresponding to a wavelength equal to λ, the panel section comprising a solid body portion of a thickness which is an integral multiple of λ/2 and which has opposing first and second ends for interconnecting with corresponding second and first ends, respectively, of a mating panel section, wherein a combined thickness of the first and second ends is equal to the thickness of the body portion. The panel section is preferably formed of thermoplastic material having a high dielectric constant and is thermoformed using a double mold.

12 Claims, 4 Drawing Sheets

RADOME PANEL

FIELD OF THE INVENTION

This invention relates to radomes and, in particular, to panels therefor.

BACKGROUND OF THE INVENTION

"Radomes" an acronym for radar domes are employed as shields for protecting antennas against harsh weather conditions and other environmental factors. Properly designed radomes are not only protective, but highly "transparent", since the performance of the antenna must be consistent and predictable regardless of variations in environmental conditions.

Since antennas used for radar and satellite communication are inevitably complex and large structures, the radome itself is also correspondingly large and, for this reason, is generally constructed by assembling a large number of panels. Various techniques for assembling radomes are known. One known type of radome employs a metal space frame (MSF) formed of a triangular lattice of metal struts, across which a thin material is stretched and which is transparent to the radar or similar signal broadcast to or from the antenna. The lattice is formed of aluminum struts whose quasi-random distribution with respect to the spherical envelope reduces the effects of interference to the radiation by the metallic lattice. On average, the loss associated with such a structure is between 0.5 to 1 dB and the energy distribution to the sidelobes is substantially random, resulting in amplification of the side lobes.

A second, more advanced, type of radome is formed of concave panels having a sandwich structure. The panel itself is made from a foam core surrounded by two fiberglass skins. The skins are pre-impregnated fiberglass-reinforced polyester laminates, with a closed-cell polyurethane foam core. The sandwich construction tapers to a solid laminate joint that may be tuned for optimal performance. The basic geometry is based on an icosahedron that is further subdivided and distorted in order to provide quasi-random dispersion.

U.S. Pat. No. 5,344,685 (Cassell) discloses a contoured sandwich radome having a core consisting of a series of flexible foam mandrels laid side-by-side, with inner and outer facings made up of a fabric impregnated with a resin system, capable of providing superior breakdown voltage characteristics when cured in one stage. Such structures are obtained by a process comprising laying a plurality of first plies of resin impregnated fabric in a contoured mold to form an outer facing. A plurality of narrow straight but flexible mandrels of plastic foam is provided, individual groups of such foam mandrels being laid in side-by-side relation on to the outer facing. One series of the foam mandrel groups is positioned in a substantially transverse direction in the mold and another series of the foam mandrel groups is positioned in a substantially longitudinal direction in the mold. The inner ends of the mandrel groups abut the sides of adjacent mandrel groups, to form a foam core. The mandrels which are essentially straight before being installed in the mold are kept from springing up from the mold contour by a restraining collar which the outer ends of the mandrels abut, the collar being removed after the mandrels have been pressured under vacuum. A plurality of second plies of resin impregnated fabric are laid over the foam core, and the plies of resin impregnated fabric are cured to form the inner and outer facings.

U.S. Pat. No. 5,357,726 (Effenberger et al.) discloses a flexible, reinforced textile composite material for constructing tensioned fabric structures having particular application, inter alia, as a radome.

U.S. Pat. No. 5,323,170 (Lang) discloses a radome constructed using a rigid or semi-rigid foam core and sandwich construction. The foam core radome has improved water rejection properties and also provides greater impact strength and consistent, high radar transparency without sacrificing weight and structural stability, thereby providing a much longer service life in moisture/impact critical environments. Preferably, the radome includes a vinyl rigid closed-cell foam core consisting of a polymeric alloy of a cross-linked aromatic polyamide urea and a linear vinyl polymer.

One of the main advantages of a radome having a sandwich construction over that based on the MSF is inherent in the possibility to tune electrically the frameworks. This is done by embedding printed circuits of the metallic networks within the fiberglass of the framework. These circuits are correlated to a specific frequency (within the working frequency range of the antenna) and greatly enhance the general transmission efficiency of the radome even to as much as 98% (less than 0.25 dB drop). On account of the correlation, a lower quantity of energy is dispersed from the framework (in certain cases less than −50 dBc relative to the peak radiation).

Such tuning of the framework has been achieved in the frequency range between the L-Band and the C-Band. At higher frequencies it is difficult to realize the tuning on account of the need to embed a large number of layers of printed circuits (in accordance with the C-Band three such layers are required). At even higher frequencies (Ku-Band and higher) the sandwich boards themselves are not sufficiently transparent. FIG. 1 shows graphically the frequency response of typical sandwich type radomes for different angles of incidence from which a noticeable drop in average transmission is seen to between 0.1 and 0.2 at frequencies between about 8 and 14 GHz.

These drawbacks of sandwich radomes do not become apparent so long as the radomes are intended for air controlled radar antennas and weather radar antennas. However, once the use of radomes is contemplated for ground based stations for satellite communications, such radomes are no longer suitable. In order not to interfere with neighboring satellites, the ground station antennae are required to withstand the stringent requirements of CCIR which limit the side lobes to less than the envelope of $29-25*\log(\theta)$ dB, or to other similar envelopes, in accordance with the class of ground station. Any deviation from this specification renders the station unfit such that it will not obtain a valid operating license.

The high scattering from MSF radomes gives rise to side lobes which, in the best case, are on the borderline of the specification. Consequently, those who install such stations are prevented from using radomes, even when the climatic conditions are extreme and protection of the antenna by means of a radome would lead to substantial operational savings and improved maintenance of the station. All of this arises from the danger of non-conformance with the CCIR standards. It might just be possible to conform sandwich radomes to ground based antenna stations which are operational in the C band i.e. 4 to 6.5 GHz for which panel transmission is high as shown in FIG. 1, although on the face of it, there is no guarantee that the radome will have sufficient bandwidth owing to possible bandwidth limitations of the tuned joints. However, it is very difficult to operate such an arrangement at both the C band and the Ku band (10.7 to 14.5 GHz) since panel transmission is not high for both frequencies simultaneously and this bears a heavy penalty in the reduction of the radome's strength.

Tuned solid wall radomes are very common in airborne, missile, naval and even small single unit ground based radomes. However, they have not been used in large segmented ground based radomes which must have tuned walls demanding tight tolerances of the wall thickness and are, therefore difficult to achieve in large sizes. Solid wall, large ground based radomes have thus only been implemented with "thin walls" wherein the wall thickness is very small compared with the operating wavelength such that they are substantially insensitive to variations in wall thickness.

Radome manufacturing processes that offer good thickness control require double molds and are usually performed at high pressure. Thus, the molds must be capable of withstanding high pressures and are therefore expensive and necessarily massive structures. There are two processes that allow manufacture of large parts at low pressure: namely, the use of Resin Transfer Molding (RTM) and the other being thermal forming of thermoplastic materials. RTM is an excellent candidate for narrow band applications wherein the high dielectric constant of the material limits the possible bandwidth of a tuned wall radome. Thermoplastic materials have much lower dielectric constants and are therefore suitable for wide band or multi-band applications such as dual band satellite communication radomes.

It will further be borne in mind that radomes for ground based antenna systems are large structures, typically several meters in diameter and must be able to withstand wind velocities well in excess of 150 mph (240 Km/h). At the same time, they must, of course, be substantially transparent to the signal which is transmitted to or from the antenna.

Most of the above references are directed to low frequency and/or narrow band applications are therefore suffer from the specified shortcomings when used for high frequency or wide band applications. Whilst, MSF radomes are suitable for such applications they suffer from high scattering sidelobes.

SUMMARY OF THE INVENTION

It is therefore an object of the invention to provide an improved radome and particularly a contoured panel section therefor in which the above-mentioned drawbacks are overcome so as to allow a plurality of such panel sections to be interconnected in modular fashion.

According to the invention there is provided a contoured panel section for a radome for use with a center frequency corresponding to a wavelength equal to $\lambda$, said panel section comprising a solid body portion of a thickness which is an integral multiple of $\lambda/2$ and which has opposing first and second ends formed integral with the body portion and of identical material therewith for interconnecting with corresponding second and first ends, respectively, of a mating panel section, wherein a combined thickness of the first and second ends is equal to the thickness of the body portion.

The invention is based on the fabrication of panels from solid material instead of sandwich material. The thickness of the body portion itself is conformed to the thickness of $\lambda/2$ or to $\lambda$, where $\lambda$ is wavelength of the radiation within the panel material. The framework is constructed from the same material as the remainder of the panel. At each overlapping joint between adjacent panels, the combined thickness of two overlapping joints is exactly equal to the basic panel thickness. Apart from the possibility of slight disturbances which derive from small pockets of air which are captured between the frames of two panels, there is perfect match between the panels and the frames. This match is independent of the frequency for which it is designed.

Multiple frequency operation may be achieved whilst exploiting the cyclic transparency of the panels in its dependency on frequency. A panel whose electrical frequency is equal to $\lambda/2$ at the lower operation frequency, has an electrical thickness at double the frequency equal to $\lambda$ and is also transparent at this frequency. For example, tuning of the thickness to a central operation frequency of 5.5 GHz produces transparency also around 11 GHz and also in the region of 22 GHz. These frequencies correspond to the Ku, C and K bands of satellite communication. The question of bandwidth still remains open as is explained in further detail below.

BRIEF DESCRIPTION OF THE DRAWINGS

In order to understand the invention and to see how the same may be carried out in practice, some preferred embodiments will now be described by way of non-limiting example only, with reference to the accompanying drawings, in which.

DETAILED DESCRIPTION OF PREFERRED EMBODIMENTS

Figure 2:
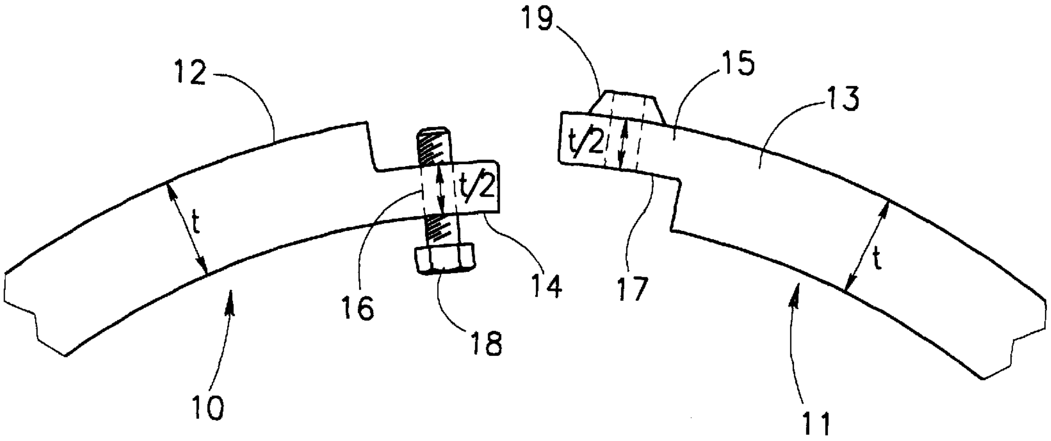
FIG. 2 shows pictorially partial sectional elevations of mating panel sections according to a first embodiment of the invention.

FIG. 2 shows a pair of contoured panel sections 10 and 11 for a radome for use with a center frequency corresponding to a wavelength equal to $\lambda$. The panel sections 10 and 11 comprise solid body portions 12 and 13 of complementary shape and having a thickness which is an integral multiple of $\alpha/2$. The body portions 12 and 13 have opposing first and second ends 14 and 15, respectively, formed integral and of identical material therewith for interconnecting with corresponding second and first ends, respectively, of a mating panel section. A combined thickness of the first and second ends 14 and 15 is equal to the thickness of the body portion. Consequently, when two adjacent panel sections are interconnected, the resulting lap joint has a surface that is uniform with the surface of the body portions whereby the transmittance of the combined panel sections is not impaired.

Formed through the first and second ends 14 and 15 are apertures 16 and 17, respectively, for accommodating therethrough a threaded bolt 18 which engages a nut 19 welded to an outer surface of the second end 15 and in alignment with the aperture 17 therein. Thus, when the adjacent panel sections 10 and 11 are interconnected, the bolt 18 and the nut 19 protrude slightly above the outer surfaces of the corresponding panel sections. These protrusions give rise to a local, albeit negligible, drop in transmission which is, in any case, much lower than the reduction in transmission associated with the joints in known sandwich constructions.

Figure 3:
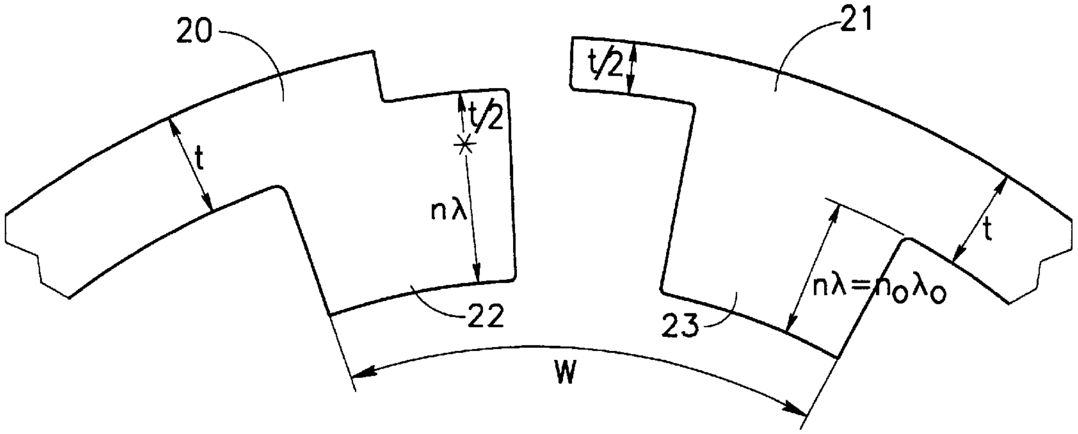
FIG. 3 shows pictorially partial sectional elevations of mating panel sections having a bulged joint with an integral beam according to a second embodiment of the invention.

From this, it may be seen that the material thickness has greater significance that the strength of the material. The required thickness for a radome in the C band is greater by a factor of about 1.4 than the thickness of the common frames (double) of large sandwich radomes. This thickness partially compensates for the reduction in material strength. It is still possible significantly to increase the relative radii as follows. A large frame may be added to each platter such that the overall thickness of the frame containing two platters is greater by an amount equal to $\lambda$ than the panel thickness itself. The frame is matched to the central frequency of the remainder of the panel. FIG. 3 shows pictorially mating panel sections 20 and 21 according to a second embodiment of the invention for constructing such a frame. The panel sections 20 and 21 have a bulged joint with an integral beam formed by interconnecting bulges 22 and 23, respectively. The depth of the bulges 22 and 23 beneath the lower surface of the panel sections 20 and 21 is equal to n times the wavelength $\lambda$ (where n is an integer), such that the overall depth of the panel sections 20 and 21, including the bulges, is equal to $(n\lambda+t)$ where $t=\lambda/2$. A second condition that must be met requires that $n\lambda=n_0\lambda_0$ where n and $n_0$ are integers and $\lambda_0$ is the wavelength in air at the center frequency. For example, this second condition is approximately met for $\epsilon=2.35$ when n=5 and $n_0=2$. When the two adjacent panel sections 20 and 21 are joined, the bulges 22 and 23 behave as a combined bulge whose width W is typically in the order of twice the bulge's thickness but is in any case no less than the thickness thereof.

One of the panel sections 21 is provided with a lap joint having a thickness equal to t/2, whilst the other panel section 20 has a complementary recess of equal thickness. It will be appreciated, however, that the joint thickness of one of the panel sections is itself not critical providing that the overall thickness of the two joints together meets the above criterion.

Figure 4:
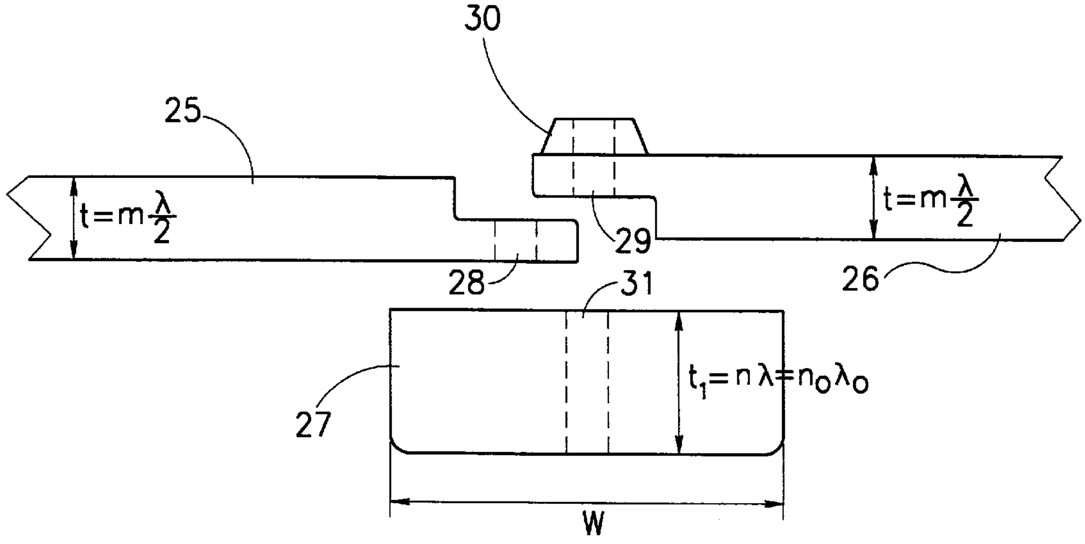
FIG. 4 shows pictorially partial sectional elevations of mating panel sections having a bulged joint with a separate beam according to a third embodiment of the invention.

FIG. 4 shows pictorially mating panel sections 25 and 26 according to a third embodiment of the invention for constructing such a frame. The panel sections 25 and 26 have a bulged joint formed by a separate beam 27 having a depth $t_1$ equal to $n.\lambda$ where n is an integer. The width W of the beam 27 is typically in the order of twice the bulge's thickness but is in any case no less than the thickness thereof. One of the panel sections 26 is provided with a lap joint having a thickness equal to t/2, whilst the other panel section 25 has a complementary recess of equal thickness. Both the lap joint and the recess are provided with mutually aligned apertures 28 and 29 for accommodating therethrough a long threaded securing bolt (not shown) for engaging a nut 30 welded to an upper surface of the panel section 26. The overall depth of the panel sections 25 and 26, including the bulge 27, is equal to $(t+t_1)$ where $t=m.\lambda/2$ and m is an integer. The bulge 27 has a width W which is 2 or 3 times greater than $\lambda$ and is also provided with an aperture 31 for accommodating the securing bolt which fixes it to the two panel sections 25 and 26.

The second and third embodiments are suitable only for narrow band applications since the matching is achieved only for a limited bandwidth and angular range, as the order of resonance increases.

The panels are formed in conventional manner using layers of fiberglass which are pre-impregnated with epoxy or polyester (referred to as "Pre-preg" in the trade) and is associated with a great deal more manual labor and material costs than is associated with the manufacture of sandwich radomes. Additionally, the relatively higher dielectric constant, $\epsilon$ of the resulting material (in the order of 4.7) gives rise to sharp narrow regions of transmission. The frequency bands within which the panel (and the frame) are transparent are narrow. In the intermediate bands, the transparency is low (a drop of several dB). When using this material, the tolerances of the thickness and uniformity of the material which are required in order to obtain transparency are very fine and unsuitable for manufacture using manual labor.

It is possible as an alternative to employ Resin Transfer Molding in which dry layers of coarse cloth or even felt are employed, whilst injecting resin under pressure to the double mold. Choice of cloths or felt (or a combination of both), using Dacron instead of glass, reduces the dielectric constant $\epsilon$ to around 3 and greatly increases the possible bandwidth of the radome. It also permits tightening of the manufacturing tolerances. Furthermore, by using a double mold in such a process, it is easier to control the manufacturing tolerances. In spite of the advantages of the method of injecting resin whereby the production costs are significantly reduced, it still does not lead to an acceptable overall price because the molds themselves are much more expensive. Such an approach may preferably be employed in extremely large radomes where strength is a decisive factor. Together with this, radomes constructed from Dacron cloth have lower strengths than corresponding radomes based on fiberglass.

According to an alternative manufacturing process, there are employed sheet molding compounds (SMC) being partially cured thermosetting materials (usually polyesters) mixed with chopped reinforcing fibers or flakes. The panels are formed under high pressure in a double mold. SMC is relatively inexpensive and the required manual assembly is simple, as a result of which SMC is a viable solution for the production of panels and some large radomes requiring high strength and relatively low unit cost.

The drawbacks of SMC are the high cost of the double steel molds required for the high pressure molding of the panels and the high dielectric constant and loss tangent ($\epsilon\cong4.5$–$4.6$; $\tan\delta=0.02$) of the resulting material.

An alternative approach is to employ thermoplastic materials instead of thermosetting materials such as epoxy and polyester. The drawbacks of thermoplastic materials lie in their lower strength and in their being less able to withstand inclement weather conditions. The invention allows for these two drawbacks to be overcome as will now be explained.

In spite of these drawbacks, some thermoplastic materials have the great advantage that they can be thermoformed, even at low pressure. The manufacturing process of thermoplastic panels requires very much less manual labor than layered structures. Likewise, thermoplastic material is less expensive than fiberglass.

A suitable thermoplastic material for mid-sized radomes (up to 5 to 6 meters) is high density polyethylene having therein an additive against UV radiation. Such material is able to withstand adverse weather conditions and is strong. One important advantage of this material during production is the relatively low temperature at which it can be worked. It starts to soften at approximately 100° C. An additional important advantage is its excellent electrical properties. Its dielectric constant, $\epsilon$ is 2.35 and its loss index is given by tan $\delta$=0.003. These properties allow for a large bandwidth and also allow for relatively large tolerances in the thickness as well as allowing for an increase in thickness by a factor of 1.4 compared to polyester-fiberglass. The increased thickness partially compensates for the reduced strength.

High density polyethylene is weaker by a factor of 20 to 25 than epoxy-fiberglass. There exists a range of alternative thermoplastic materials that are stronger and still have good electrical properties. So far as strength of thermoplastic materials is concerned, at the other end of the spectrum there is, for example, PEI. Its strength is some four times greater than that of polyethylene. By the addition of finely chopped fibers mixed with reinforcing material, the strength can reach even 15 times that of polyethylene. The price which must be paid for so high a strength is in electrical properties. The dielectric constant, $\epsilon$ of PEI is equal to 3 for pure materials and is equal to 3.4 for the material reinforced with 20% chopped fibers whilst tan $\delta$=0.003–0.006. The dielectric constant, $\epsilon$ and loss tangent of this material are still relatively low compared to epoxy or polyester-fiberglass (4.7 and tan $\delta$=0.017). Between the two extremes of PEI and polyethylene, there is a wide variety of materials (such as, for example, noril and polycarbonate) whose electrical and mechanical properties lie somewhere between the two extremes, such that a suitable combination of the electrical and mechanical properties can be selected. The price of the base material and the working temperatures also varies according to the choice of material. For PEI, for example, the material softens at the particularly high temperature of 200° C.

The maximum size of the radome is determined in accordance with the buckling strength under wind loading. The buckling pressure is given by:

$$P = \frac{1}{2}\rho v^2 = kE\left(\frac{t}{R}\right)^2$$

where:

P=the wind pressure, p=the specific gravity of air, v=the wind velocity, k=a constant (in the order of 0.2), t=the plate thickness, R=the radius of the spherical radome, and E=the elastic modulus of the material.

On the basis of this the radii of two radomes constructed from different materials but intended to withstand identical wind pressures may be related by:

$$\frac{R_1}{R_2} = \sqrt{\left(\frac{E_1}{E_2}\right)} * \frac{t_1}{t_2}$$

The proposed process for working with thermoplastic materials involves shaping under applied heat and low pressure within a double mold. The double mold allows for good control of the panel and frame thickness. In order to accelerate the process, it is desirable to pre-heat the material platters in an oven and then to apply final heating and pressure in the mold.

Figure 5:
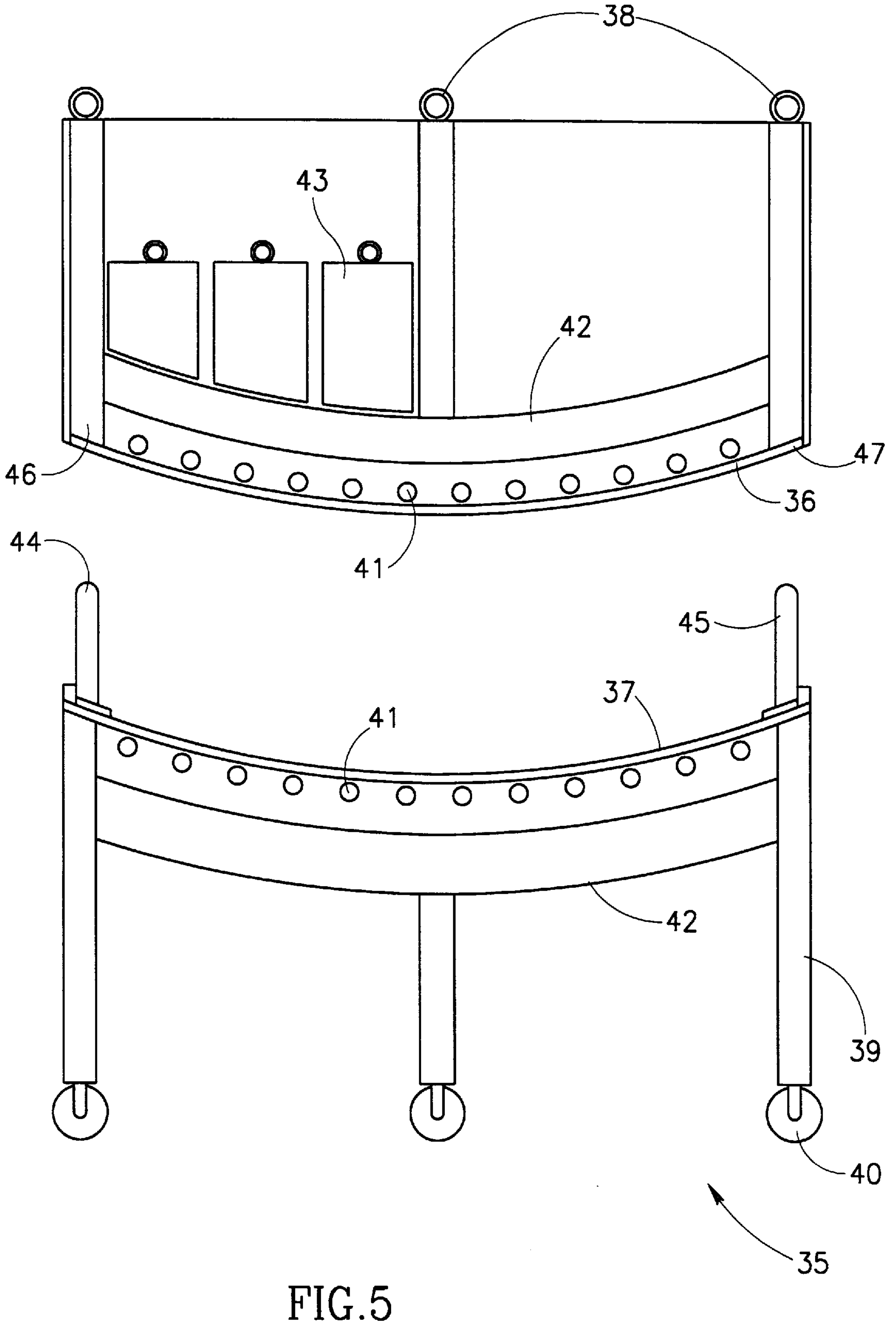
FIG. 5 shows schematically a double mold used for molding the radome panels illustrated in FIGS. 2 to 4.

FIG. 5 shows a double mold 35 comprising an upper section 36 which is raised and lowered with respect to a lower section 37 by means of a crane (not shown) in order to allow for the introduction and removal of the panels. The upper section 36 has lifting lugs 38 for attaching the crane thereto, whilst the lower section 37 has downwardly projecting legs 39 having wheels 40 rotatably attached thereto so as to allow the mold 35 to be moved. Both the upper and lower mold sections 36 and 37 have respective electrical heating elements 41 embedded therein which are thermally insulated from the outside by means of respective insulating layers 42. The upper section 36 is loaded with blocks of lead or concrete 43 in order to exert pressure on the product. The upper section 36 is directed towards the lower section 37 by means of guide rods 44 and 45 which project from the lower mold section 37 and engage corresponding bores 46 and 47 in the upper mold section 36. At the edges of the mold 35 are provided approximately L-shaped dies 48 having a vertical portion 49 and a horizontal portion 50. An upper edge of the vertical portion 49 of the die 48 serves as a limit stop which prevents the upper half of the mold from descending and thus determines the panel thickness. The horizontal portion 50 of the die 48 serves to reduce the thickness of the panel edge, thereby producing the desired lap joint by means of which the two halves of the mold are joined together.

The panel is cured in the mold in a few minutes, the exact time depending on the rate of heating and on the pre-heating of the platter. The upper section of the mold is then lifted and the platters removed.

The process requires very much less manual labor than accepted processes for use with thermosetting materials requiring a large number of layers to be placed one on top of the other. The base material is less expensive and its shelf life is substantially unlimited. A further simplification of the manufacturing process using thermoplastic materials is achieved by introducing the raw material into the mold in a powder or flake form rather than as a preformed flat panel. The raw material is much cheaper and can fit into more complex forms such as a bulged edge frame. Thermoplastic materials, such as high density polyethylene in powder form, that lend themselves to the process of rotational molding are suitable candidates for such a process.

Figure 6:
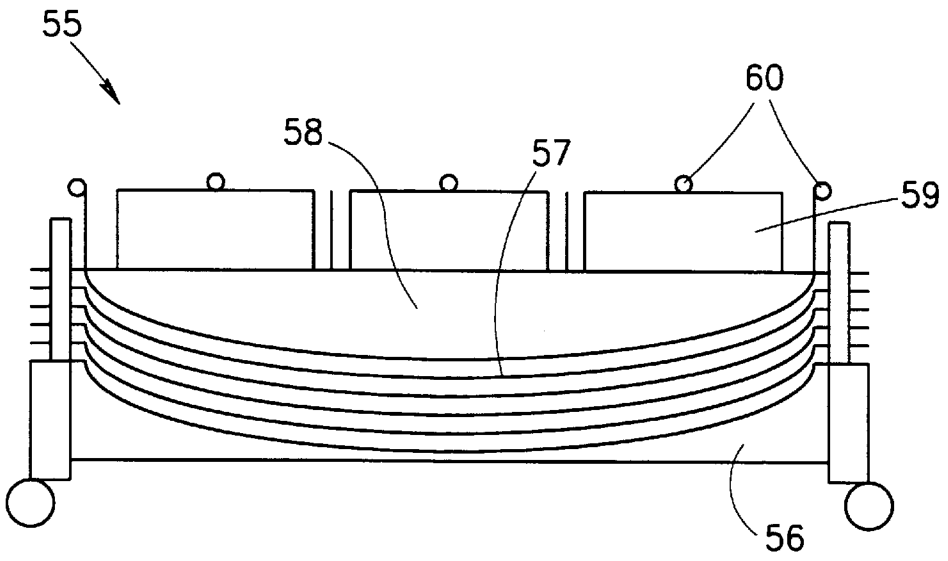
FIG. 6 shows schematically an alternative double mold having a plurality of layers for molding several radome panels simultaneously.

FIG. 6 shows schematically a detail of a stacked double mold designated generally as 55 having a base 56 and a plurality of platters 57, a topmost one of which 58 is weighted with heavy weights 59. The weights 59 and the topmost platter 58 are hoisted via eyelets 60 so as to be lowered and raised as required. Such a mold 55 permits a plurality of radome panels to be molded simultaneously, the weights 59 and the inherent mass of the platters 57 affording the necessary high pressure for thermoforming the panel material. In use, the mold 55 may be provided with integral heating elements or may be placed inside an oven in order to cure the radome panels.

Figure 1:
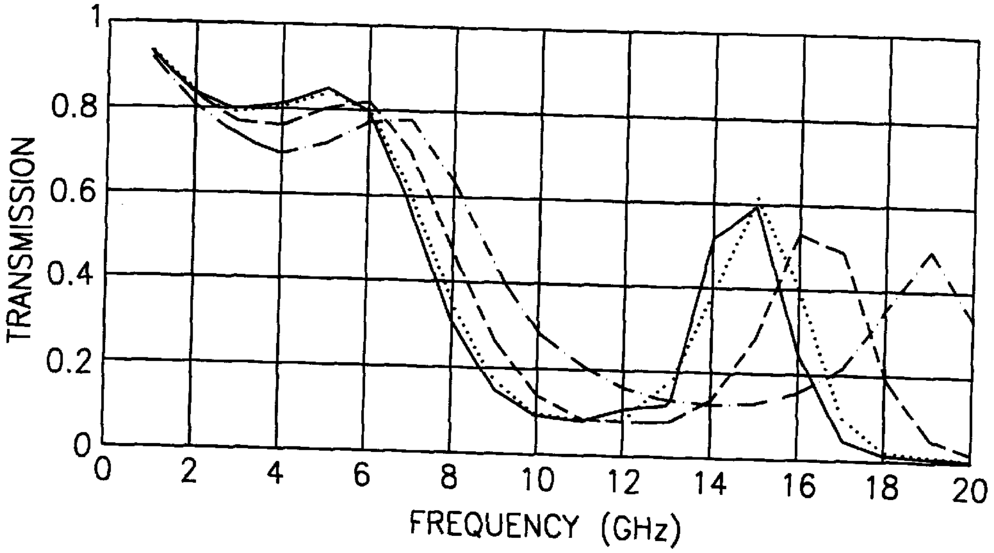
FIG. 1 shows graphically various transmission/frequency response curves for typical prior art sandwich type radomes.
Figure 7:
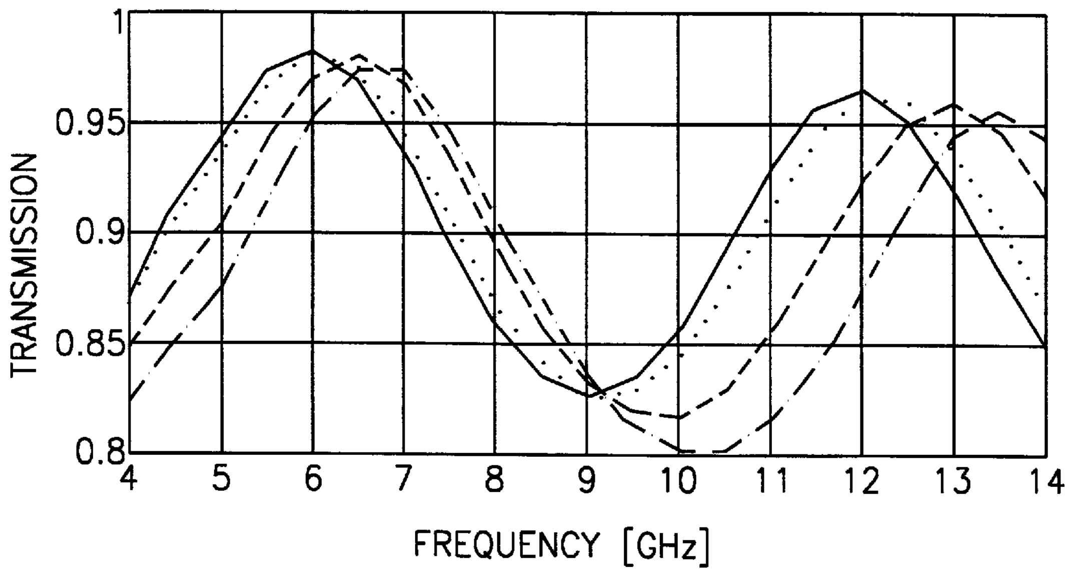
FIG. 7 shows graphically various transmission/frequency response curves for the radomes constructed according to the invention.

FIG. 7 shows graphically the frequency response of typical radomes constructed from panel sections according to the invention for different angles of incidence. It can be seen that at frequencies between about 8 to 14 GHz, the average transmission hovers around 0.8 to 0.97. This represents a marked improvement over prior art sandwich constructions whose frequency response characteristics are shown in FIG. 1. The following parameters are assumed: $\epsilon$=2.35; tan $\delta$=0.003 and the thickness t of the panel section being equal to 17.6 mm. These parameters correspond to the electrical properties of high density polyethylene.

Whilst the invention has been described with particular reference to solid body panel sections, it is to be noted that certain principles described above may also be applicable to sandwich panel sections. For example, if the electrical thickness of the sandwich panel is equal to $\alpha\lambda$, then the thickness of the compound joint should be set to $(\alpha+m).\lambda$ where m is an integer. Amplitude and phase match is possible when $\alpha$ is close to an even multiple of $\lambda/4$. However, if $\alpha$ is close to an odd multiple thereof, amplitude match is impossible.

I claim:

1. A contoured panel section for a radome for use with a center frequency corresponding to a wavelength equal to $\lambda$, said panel section comprising a solid body portion of a thickness which is an integral multiple of $\lambda/2$ and which has opposing first and second ends for interconnecting with corresponding second and first ends, respectively, of a mating panel section, wherein a combined thickness of the first and second ends is equal to the thickness of the body portion.

2. The contoured panel section according to claim 1, having a bulge of thickness $n.\lambda$ which is equal to $n_0.\lambda_0$ where n and $n_0$ are integers and $\lambda_0$ is the wavelength in air at the center frequency and said bulge having a width which is no less than said thickness.

3. The contoured panel section according to claim 2, wherein the bulge is integral with the body portion of the panel section.

4. The contoured panel section according to claim 2, wherein the bulge comprises a discrete beam attached to the body portion of the panel section.

5. The contoured panel section according to claim 1, being formed of a thermoplastic material.

6. The contoured panel section according to claim 5, having a combined thickness which exceeds a corresponding thickness of a sandwich panel formed of glass-reinforced thermosetting material and which is calculated to provide approximately equal strength thereto.

7. A method for manufacturing the contoured panel section according to claim 1, said method comprising the steps of:

(a) applying high strength thermoplastic material to complementary halves of a double mold having upper and lower sections, (b) with both halves of the double mold mutually apart, pre-heating the high strength thermoplastic material in both halves of the double mold, (c) drawing the upper and lower sections toward each other to a predetermined mutual separation, and (d) applying pressure between the two halves of the double mold so as to thermoform the panel section between the two halves of the double mold.

8. The method according to claim 7, wherein the pressure applied in step (d) is derived by a self-weight of the upper section.

9. The method according to claim 8, wherein the pressure applied in step (d) is further augmented by means of weights applied to the upper section.

10. The method according to claim 7, wherein high strength thermoplastic material is applied in powder or flake form to the two halves of the double mold.

11. The method according to claim 7, wherein the double mold has a plurality of stacked mold sections for molding a plurality of panels simultaneously.

12. In a radome for use with a center frequency corresponding to a wavelength of $\lambda$, said radome comprising at least one contoured panel section and at least one mating panel section, the improvement wherein said contoured panel section comprises a solid body portion of a thickness which is an integral multiple of $\lambda/2$ and which has opposing first and second ends for interconnecting with corresponding second and first ends, respectively, of said at least one mating panel section, wherein a combined thickness of the first and second ends is equal to the thickness of the body portion.

* * * * *